Aug. 6, 1929.    B. HOCKEN    1,723,420
SIGNALING AND INDICATING APPARATUS
Filed May 21, 1928
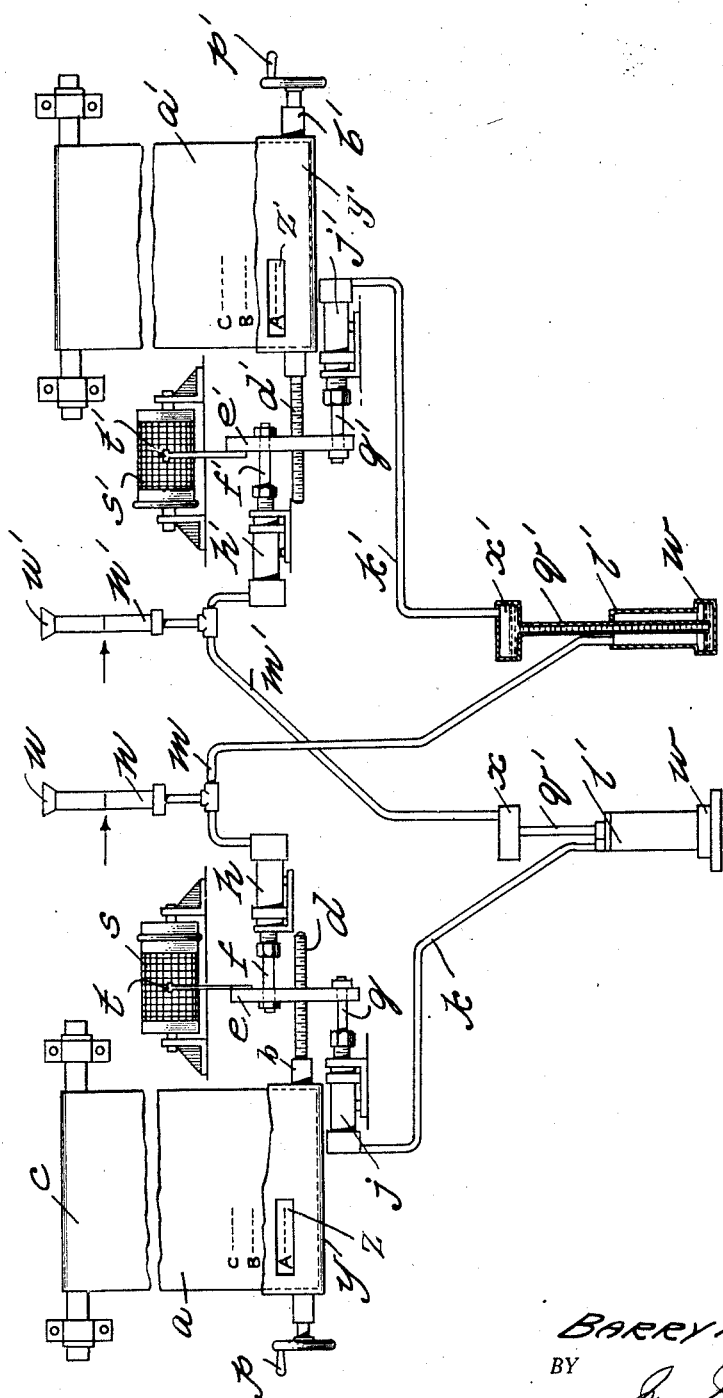
INVENTOR.
BARRY HOCKEN
BY
ATTORNEY.

Patented Aug. 6, 1929.

1,723,420

UNITED STATES PATENT OFFICE.

BARRY HOCKEN, OF POLRUAN, FOWEY, ENGLAND, ASSIGNOR TO HYDRO-INDICATORS LIMITED, OF LONDON, ENGLAND, A BRITISH COMPANY

SIGNALING AND INDICATING APPARATUS.

Application filed May 21, 1928, Serial No. 279,556, and in Great Britain May 27, 1927.

This invention relates to signaling and distant indicating apparatus in which the transmitting medium employed is a liquid and is particularly applicable for transmitting messages over comparatively short distances such as from an hotel bar to an office or kitchen, or from a ship's control room to such as gun positions and particularly in cases in which it is desirable to transmit the message or information to more than one station. The invention is also applicable to apparatus for indicating from a distance the movement to be given to a machinery part such as the steering gear of a ship.

The primary object of the invention is to provide an apparatus in which the message or indication is transmitted by displacement of fluid in the pipe system, a predetermined amount of fluid being displaced at the transmitting station and the message being read or the indication being transmitted by the displacement in the opposite direction of a corresponding amount of fluid at the receiving station.

In the preferred form of the invention there is a double pipe system between the two stations and a double system of displacers with an open datum tube at each station so that at either station a signal is given when the correct signal movement or the like has been carried out.

In the preferred embodiment of the invention, the indicator consists of a number of items arranged on a blind or the like, and the operating member consists of a handle operating a shaft for moving the roller over which the blind passes. The movement of the operating member is transmitted by suitable screw, link, or other mechanism to a member which causes relative movement between a plunger and a cylinder. The cylinder is filled with liquid and communicates by means of a pipe to one or more distant stations where an indicating tube for liquid is provided with receivers as required. At each distant station a corresponding indicating mechanism is provided together with a plunger and cylinder. By operating this indicating mechanism and causing equal and opposite liquid displacement until the liquid returns to datum level in its gauge tube, the indicator will then be set to give the message transmitted. Preferably, a gauge tube and two independent but jointly operated cylinders are provided at each station so that messages may be transmitted in either direction and agreement and receipt of signal indicated. By the provision of suitable valve mechanism, any one station of a series can be arranged to transmit to any other one.

A feature of the apparatus is that the pressure of the liquid is not utilized to transmit the message, but only the displacement in volume, and equal and opposite displacements are necessary to the operation. In cases in which there is a difference of level between the transmitting and the receiving station, a U-tube device employing a heavy liquid of practically constant head may be used and the flow of the heavy liquid may be from and to large receivers for this purpose.

In the accompanying drawing the figure is a substantially diagrammatic illustration of an embodiment of the invention consisting in a signaling apparatus in which the various items to be transmitted are carried upon an endless band.

Referring to the above drawings at the two stations are provided rollers $b$, $c$, $b^1$, $c^1$ between which are carried bands $a$, $a^1$ each of which bears various items correspondingly spaced which are indicated A . . . ., B . . . ., C . . . . such items indicating words or the like to be transmitted from one station to the other. Suitable means, not shown, is provided for ensuring that the bands do not slip relatively to their rollers and these rollers are preferably mounted in casings $y$, $y^1$, which are shown broken off on the drawing, containing viewing windows $z$, $z^1$. The lower rollers $b$, $b^1$ are provided with operating handles $p$, $p^1$ and have projecting at the opposite ends threaded shafts $d$, $d^1$ engaging crossheads $e$, $e^1$. These cross-heads carry oppositely directed plungers $f$, $g$, $f^1$, $g^1$ passing into cylinders $h$, $j$, $h^1$, $j^1$.

From the cylinder $h$ passes a pipe $m$ carrying a datum tube $n$ provided with a suitable datum or index mark and this tube $m$ is then connected by a pipe $k^1$ passing into the cylinder $j^1$.

From the cylinder $h^1$ passes a pipe $m^1$ carrying a datum tube $n^1$ provided with a suitable datum or index mark and this tube $m^1$ is then connected by a pipe $k$ passing into the cylinder $j$.

The cylinders and pipes are filled with water, oil or other suitable liquid and if the two stations are not at the same level, balance units $l$, $l^1$ are provided having a tube $q$, $q^1$ of mercury or other suitable heavy liquid to reduce the two stations to the equivalent hydrostatic level.

The balance unit $l^1$ is shown upon the drawings as in section and it is preferred to provide as shown upper and lower vessels $x$, $x^1$, $w$, $w^1$ the cross sectional area of which is greater in relation to that of the tubes $q$, $q^1$ so that the volume displacement of liquid in the system will always enable the junction surfaces of liquid to remain in the larger vessels.

The datum tubes $n$, $n^1$ are open to atmosphere at the tops and may be provided with filling bells $u$, $u^1$ for facilitating zeroising of the apparatus; means may also be provided in each pipe line for withdrawing or adding fluid for the purpose of adjustment and zeroising but such means is of course locked during the normal operation of the apparatus.

In order to provide record of the signals, the cross-heads may carry markers $t$, $t^1$ engaging record drums $s$, $s^1$ which are preferably time-driven.

The operation of the apparatus shown on the drawings is as follows:—Assuming that the station on the left hand side of the drawing is the transmitting station, the operator turns the handle $p$ until the item printed on the band $a$ appears in the window $z$.

We will assume that this movement causes the cross-head $e$ to move to the right; this causes a displacement of liquid from the cylinder $h$ which causes the liquid in the datum tube $n$ to rise, and a withdrawal of liquid from cylinder $j$ which causes the liquid in the distant datum tube $n^1$ to fall by a corresponding amount.

The operator at the distant station now sees that a signal has been made and turns his handle $p^1$ until the liquid in his datum tube $n^1$ returns to his index or datum line. In so doing he will have moved his band $a^1$ until by the displacement of liquid in the cylinder $h^1$ the same word or item appears at his window $z^1$ as has been set at the transmitting station.

At the same time liquid will have been withdrawn from the cylinder $j^1$ and this will have caused the liquid in the transmitting station's datum tube $n$ to return to datum thus showing to the transmitting operator that his signal has been received.

It is to be understood that instead of the item band at the transmitting station the operating handle itself might work over a graduated scale and at the receiving station there need be no actual item scale but the displacer at the receiving station need only be moved until the liquid in the datum tube returns to zero position.

The invention, for instance, can be employed for use in steering indicators for ships. In this case, the displacer at the transmitting station is connected up to the steering wheel and a similar displacing apparatus is provided near the rudder head, the displacement in the latter case being in an opposite direction from that of the steering wheel. The datum tube in this case would be near the steering wheel and the operator of the steering wheel can then tell by the position of the liquid in his datum tube whether the steering mechanism has responded to the movement of his steering wheel.

In other cases, such as in controlling machinery from a distance, the necessary movement to be transmitted to a machine can be given by means of displacement at the transmitting station and the machine itself may carry the reverse displacer and the machine operator will allow the machine to go on moving until the liquid level in the datum tube is zero. One transmitting station may be coupled up to any number of receiving stations and by operating the transmitter by means of a controlling machine at the transmitting station, machines at all receiving stations can thus be made to copy this master movement.

It is to be understood that the invention is not restricted to the exact details shown and described but embraces such modifications as come within the ambit of the accompanying claims.

I claim:—

1. Signaling and indicating apparatus of the liquid level type for transmitting between stations comprising in combination a pipe system, filled with liquid and open to atmosphere at each station, means at the transmitting station for displacing a given volume of liquid in the pipe system corresponding to a message to be transmitted, said displacement affecting an indicating device at the receiving station, and means for giving an opposite displacement at the receiving station until the indicator at said receiving station returns to initial position.

2. Signaling and indicating apparatus for transmitting instructions at a distance comprising a main or control station and one or more secondary stations in which the stations are connected by a pipe system filled with liquid at atmospheric pressure and at the main station a predetermined amount of liquid is displaced corresponding to a given instruction and at the secondary stations mechanism is operated to give a contrary displacement until the liquid level returns to datum.

3. Signaling and indicating apparatus of the liquid level type for transmitting between stations comprising in combination two pipe systems filled with liquid connected between said stations and open to atmosphere, means at the transmitting station for displacing in each system a volume of liquid corresponding to a message to be transmitted, said displacement affecting an indicating device at each station and means at the receiving station for giving in each system an opposite displacement until the indicator at both stations returns to zero.

4. Signaling and indicating apparatus of the liquid level type for transmitting between stations comprising in combination a pipe system, filled with liquid and open to atmosphere at each station, an indicator at the transmitting station, operating means for said indicator, a liquid displacer connected to said pipe system, means for actuating said displacer having geared relation with said operating means, means for indicating at the receiving station the amount of said displacement, and means for giving an opposite displacement at the receiving station until the indicator at said receiving station returns to initial position.

5. Signaling and indicating apparatus of the liquid level type for transmitting between stations comprising in combination two pipe systems filled with liquid connected between said stations and open to atmosphere, an indicator at the transmitting station, operating means for said indicator, two liquid displacers, one connected to each pipe system, means for actuating said displacers having geared relation with said operating means, means for indicating at each station the amount of said displacement and means at the receiving station for giving in each system an opposite displacement until the indicator at both stations returns to zero.

6. Signaling and indicating apparatus of the liquid level type for transmitting between stations comprising in combination two pipe systems filled with liquid connected between said stations and open to atmosphere, an indicator at the transmitting station, operating means for said indicator, two liquid displacers, one connected to each pipe system, means for actuating said displacers having geared relation with said operating means, means for indicating at each station the amount of said displacement, means at the receiving station for giving in each system an opposite displacement until the indicator at both stations returns to zero, and an indicator at the receiving station having geared relation with the displacement means.

7. Signaling and indicating apparatus of the liquid level type for transmitting between stations comprising in combination two pipe systems filled with liquid connected between said stations and open to atmosphere, a roller blind indicator, at the transmitting station, operating means for said indicator, two liquid displacers, one connected to each pipe system, means for actuating said displacers having geared relation with said operating means, means for indicating at each station the amount of said displacement and means at the receiving station for giving in each system an opposite displacement until the indicator at both stations returns to zero.

8. Signaling and indicating apparatus of the liquid level type for transmitting between stations compising in combination a pipe system, filled with liquid and open to atmosphere at each station, means at the transmitting station for displacing a given volume of liquid in the pipe system corresponding to a message to be transmitted, said displacement affecting an indicating device at the receiving station, means for giving an opposite displacement at the receiving station until the indicator at said receiving station returns to initial position, and a column of liquid of greater density than the remainder of the liquid inserted in the pipe system, said column reducing the two stations to equivalent hydrostatic levels.

In testimony whereof I affix my signature.

BARRY HOCKEN.